Figure 1:
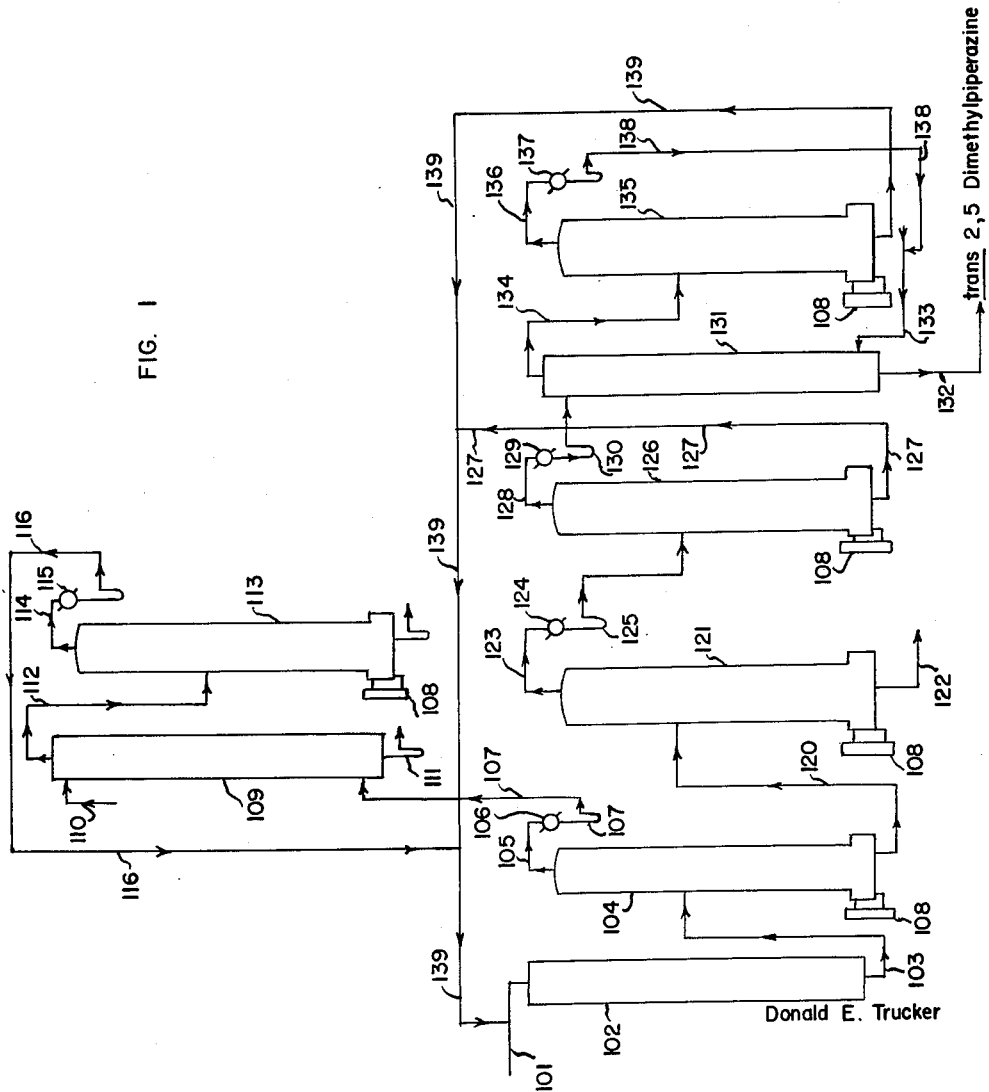

Dec. 4, 1962     D. E. TRUCKER     3,067,201

METHOD OF MANUFACTURING CIS 2,5-DIMETHYL-PIPERAZINE

Filed Aug. 11, 1955     2 Sheets-Sheet 1

Donald E. Trucker

*INVENTORS*

BY
Attorneys

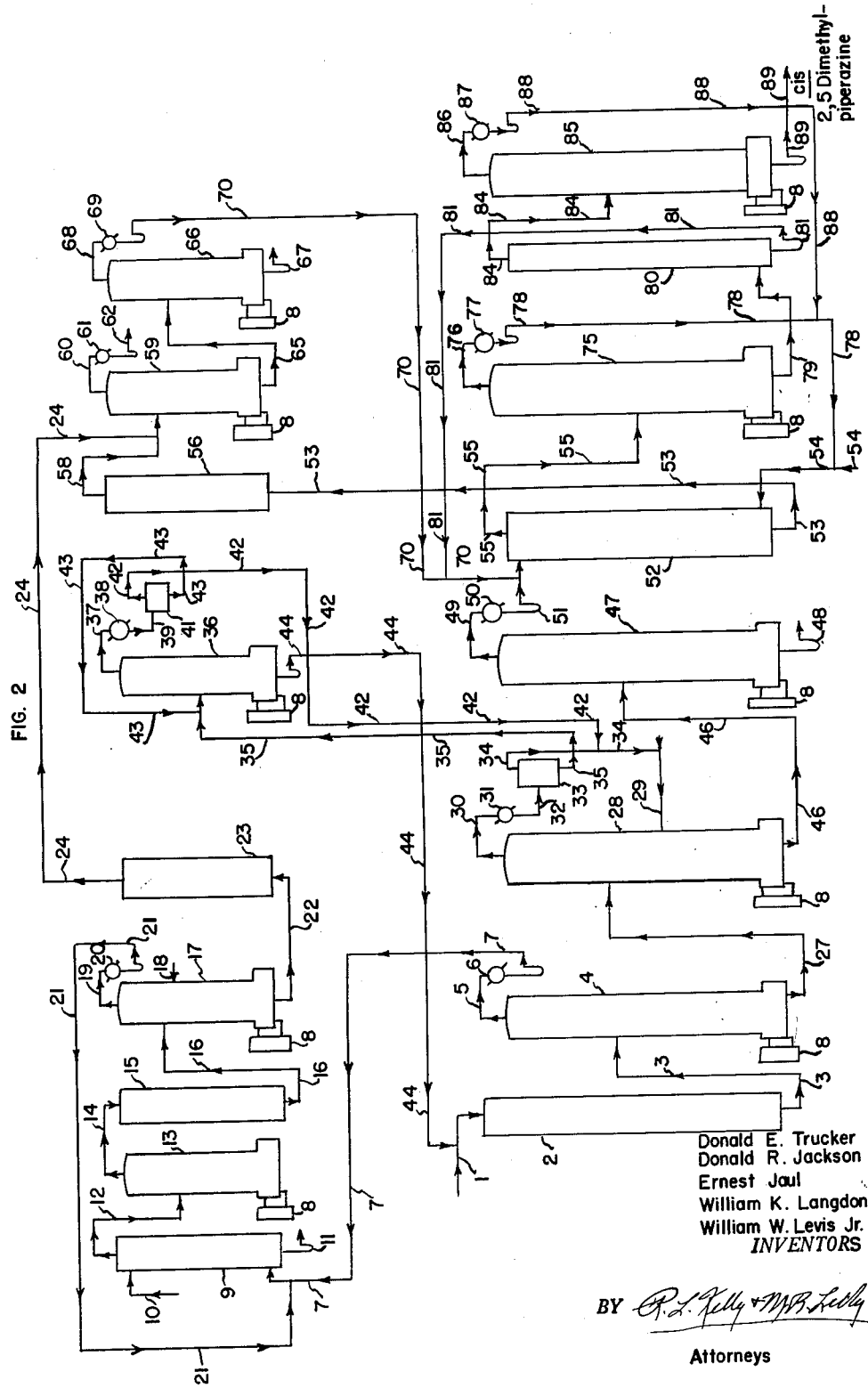

under hydrogen pressures of at least 200 p.s.i., and preferably# United States Patent Office 3,067,201
Patented Dec. 4, 1962

3,067,201
METHOD OF MANUFACTURING CIS 2,5-DIMETHYL-PIPERAZINE
Donald E. Trucker, Wyandotte, Mich., assignor to Wyandotte Chemicals Corporation, Wyandotte, Mich., a corporation of Michigan
Filed Aug. 11, 1955, Ser. No. 527,698
1 Claim. (Cl. 260—268)

The present invention relates to a method of manufacturing trans 2,5-dimethylpiperazine. More particularly, the present invention relates to a method of manufacturing trans 2,5-dimethylpiperazine in which isopropanolamine is heated with a nickel hydrogenation/dehydrogenation catalyst under critical conditions of time, temperature and hydrogen pressure so as to prepare predominantly trans 2,5-dimethylpiperazine. In addition, the invention relates to processes in which cis and trans 2,5-dimethylpiperazine can be isomerized and/or interconverted into each other.

BACKGROUND OF INVENTION

The copending applications of W. K. Langdon, Serial No. 403,149, filed January 11, 1954, now abandoned, and Serial No. 575,349, filed April 2, 1956, now abandoned, disclose a process in which isopropanolamine is contacted with a nickel hydrogenation/dehydrogenation catalyst so as to prepare a mixture of 2,5-dimethylpiperazine and 2,5-dimethylpyrazine. The described process is an excellent one which gives high yields and high conversions, but unfortunately neither 2,5-dimethylpiperazine nor 2,5-dimethylpyrazine is obtained as the sole product of the process. The Langdon process is further complicated by the fact that 2,5-dimethylpiperazine exists in two stereoisomeric forms, the cis isomer which distills approximately 164° and melts at approximately 19° C. and the trans isomer which distills at approximately 162° C. and melts at approximately 118° C. Thus, the Langdon process actually gives three separate products.

Certain of the shortcomings of the Langdon process can be overcome, but only through additional process steps and at a considerable sacrifice in overall yields. For example, it is known that 2,5-dimethylpiperazine can be dehydrogenated to 2,5-dimethylpyrazine and through the additional step of dehydrogenating the 2,5-dimethylpiperazine obtained in the Langdon process it is possible to obtain 2,5-dimethylpyrazine as the sole product. Similarly, 2,5-dimethylpyrazine can be reduced, either chemically or catalytically, and by reducing the 2,5-dimethylpyrazine obtained in the Langdon process it is possible to obtain 2,5-dimethylpiperazine as the sole product. The 2,5-dimethylpiperazine so obtained, however, is a mixture of the cis and trans isomers. There are many applications for 2,5-dimethylpiperazine in which it is either necessary or highly desirable to use either the pure cis or the pure trans isomer. In particular, in the preparation of linear condensation polymers, use of the trans isomer will give a symmetrical polymer of higher melting point than can be obtained through use of either the cis isomer or a mixture of the two isomers. Consequently, there is a need in the art for a process in which isopropanolamine can be converted to predominantly trans 2,5-dimethylpiperazine. Similarly, the is a need in the art for a process in which either cis or trans 2,5-dimethylpiperazine can be isomerized and/or converted into its stereoisomer.

Accordingly, it is an object of this invention to provide a process in which isopropanolamine is converted into a product consisting predominantly of trans 2,5-dimethylpiperazine.

Another object of this invention is to provide a process in which either the cis or the trans isomer of 2,5-dimethylpiperazine can be converted into its stereoisomer.

These and other advantages and objectives of the present invention will be apparent from the following detailed description thereof.

SUMMARY OF INVENTION

I have now discovered that isopropanolamine can be heated in the presence of a nickel hydrogenation/dehydrogenation catalyst at high temperatures under superatmospheric hydrogen pressure for relatively long reaction times to obtain a reaction product consisting predominantly of trans 2,5-dimethylpiperazine. By predominantly trans, I mean a product in which at least 50% of the 2,5-dimethylpiperazine obtained is the trans isomer. Frequently it is possible by the process of this invention to obtain 2,5-dimethylpiperazine that contains up to about 85% trans isomer. To obtain a product consisting predominantly of trans 2,5-dimethylpiperazine it is essential that the process be carried out at a tempearture of at least 180° C., and preferably 200° C. or higher, and under hydrogen pressures of at least 200 p.s.i., and preferably 400 p.s.i. or higher. The process of the present invention is illustrated by the following example.

EXAMPLE 1

One hundred and twenty pounds of isopropanolamine and four pounds of Raney nickel (added as a 50% aqueous slurry) were charged to a 25 gallon autoclave. All oxygen was displaced from the reactor with hydrogen and the reaction mixture was heated for 6 hours at 220° C. under 1200 pounds hydrogen pressure. The product contained 70 pounds of 2,5-dimethylpiperazine which represented a conversion of 76% on the isopropanolamine charged. The 2,5-dimethylpiperazine consisted of 83% trans isomer and only 17% cis isomer. Only about 0.5 pound of 2,5-dimethylpyrazine was obtained.

In addition to our basic invention, i.e. a process of converting isopropanolamine to predominantly trans 2,5-dimethylpiperazine, I have made the ancillary discovery that either cis 2,5-dimethylpiperazine or trans 2,5-dimethylpiperazine can be heated in the presence of a nickel hydrogenation/dehydrogenation catalyst to form a mixture of both the cis and trans isomers. Employing the principle of this ancillary discovery, I have developed recycle processes in which isopropanolamine can be converted solely to either trans 2,5-dimethylpiperazine or to cis 2,5-dimethylpiperazine.

DEFINITION OF TERMS

As used in the subsequent discussion of the invention, conversion is a measure of the percent of the charged isopropanolamine that is converted to the product of interest, whether cis or trans 2,5-dimethylpiperazine or both and is calculated in accordance with the equation:

Percent conversion
$$= \frac{(2) \times (\text{mols product obtained}) \times (100)}{(\text{mols isopropanolamine charged})}$$

Yield is calculated on the basis of the isopropanolamine actually consumed in the reaction in accordance with the equation:

Percent yield $= \dfrac{(2) \times (\text{mols product obtained}) \times (100)}{(\text{mols isopropanol-} \ (\text{mols isopropanol-}}{\text{amine charged}) - \text{amine recovered})}$ In the examples where Raney nickel was employed as the catalyst, the concentration of catalyst employed is expressed on a basis of grams of dry catalyst per mol of isopropanolamine, although the catalyst was actually added to the reaction as a wet slurry. A standard experimental procedure was developed for weighing and transferring the wet Raney nickel catalyst and the wet catalyst contained approximately 50% ±5% nickel.

EXPERIMENTAL PROCEDURE

Unless otherwise noted, all data reported herein were obtained by the following described experimental procedure. Twenty to thirty-three mols of isopropanolamine and the appropriate quantity of Raney nickel catalyst were charged into a one gallon stainless steel stirred autoclave. The autoclave was swept free of air first with nitrogen and subsequently with hydrogen to provide a hydrogen atmosphere. The autoclave was then sealed and pressurized with hydrogen at room temperature to a pressure that was calculated to give the desired operating pressure at the selected operating temperature. The autoclave was then heated to operating temperature and the pressure was set at the desired operating pressure either by adding additional hydrogen or by venting any excess hydrogen pressure. Filtration of the reaction mixture gave a crude product consisting of unreacted isopropanolamine, if any, trans 2,5-dimethylpiperazine, cis 2,5-dimethylpiperazine, 2,5-dimethylpyrazine, water and by-products.

The crude product was resolved into its components by distillation. A first cut was taken to a head temperature of approximately 110° C. to remove water and any 2,5-dimethylpyrazine present in the product distilled therewith as an azeotrope. The yield of 2,5-dimethylpyrazine was determined by ultra violet absorption of the aqueous forerun at 275 mu wavelength. A very small intermediate cut was taken between 110° C. and 155° C. and discarded. A main cut was taken between 155° C. and 165° C. and consisted of both cis and trans 2,5-dimethylpiperazine and any unreacted isopropanolamine. The isopropanolamine and 2,5-dimethylpiperazine have different titration curves and the percent unreacted isopropanolamine in the mixture was determined from titration curves by the use of suitable quadratic equations. If the product contained unreacted isopropanolamine, ethylbenzene or xylene was added thereto and the unreacted isopropanolamine was removed therefrom as an azeotrope as described in the copending application of John T. Patton, Serial No. 395,380, filed December 1, 1953. Ultimately, the percentage of the cis and trans isomers in the 2,5-dimethylpiperazine product was determined by infrared analysis from standards prepared from pure samples of the two isomers.

Any distillation residue in the still pot consisted primarily of by-products and was discarded.

CATALYST EMPLOYED

Any finely divided nickel hydrogenation/dehydrogenation catalyst may be used in the invention although, of course, the overall yields and conversions and particular distribution of products obtained will vary considerably with the particular catalyst employed. The catalyst of choice will vary considerably, depending upon the particular set of reaction conditions used. In batch-scale reactions under hydrogen pressure, alloy skeleton nickel catalysts have proved to be the preferred catalysts among those tested. Alloy skeleton nickel catalysts are prepared by leaching or chemically dissolving a reactive metal from a finely divided binary alloy of the reactive metal and nickel. The resulting alloy skeleton of nickel is highly porous and provides an extremely active catalyst surface. The primary example of an alloy skeleton nickel catalyst is Raney nickel which is manufactured by the Raney Catalyst Company of Chattanooga, Tennessee. This catalyst may be purchased as a pyrophoric nickel suspension that is shipped under water or may be prepared as needed by dissolving aluminum from a finely divided aluminum-nickel alloy with caustic soda.

In many cases a supported catalyst is preferred, particularly where the process is carried out on a continuous basis. Such catalysts are commercially available and are furnished in wide range activities. A common method of preparing such catalysts is to suspend a finely divided inert catalyst support such as kieselguhr, silica gel, pumice, etc., in an aqueous solution of a nickel salt such as nickel sulfate or nickel chloride. An aqueous solution of sodium carbonate is then added to the vigorously agitated mixture to produce an insoluble nickel carbonate. The resulting slurry is then filtered and thoroughly washed with water to remove all sulfate or chloride ions. The powdered mixture of nickel carbonate and catalyst support is dried, mixed with a lubricant and a binder, e.g. graphite and Sterotex, and pressed into pellets or other desired physical form. The pellets are then heated to about 350–400° C. to convert the nickel carbonate to nickel oxide and then reduced in a stream of hydrogen at a temperature from 325° C. to 375° C. Where the catalyst is to be cooled to room temperature and stored before use, the catalyst is stabilized to maintain its catalytic activity. A number of stabilizing techniques are used in the catalyst art, one of the most common of which is to partially reoxidize the nickel. As a result, many of the commercially-available supported nickel catalysts are actually mixed nickel-nickel oxide catalysts. Such catalysts are highly effective in the process of the present invention. Where a more highly active catalyst is desired, however, the activity may be increased by heating the catalyst for a period of time in a slow stream of hydrogen to reduce the nickel oxide. For an excellent review of the preparation of nickel catalysts of the type that can be employed in the present invention see "Catalysis" by Berkman et al. (Reinhold Publishing Co., 330 W. 42nd St., New York City, 1940 edition, pp. 253–263).

EFFECT OF REACTION TIME

Reaction time has a very important effect on the process of the present invention for not only does it have an effect upon the conversions obtained in the process, but it also has an important effect upon the ratio of the cis and trans isomers obtained in the 2,5-dimethylpiperazine product. Although the precise effect that reaction time has upon the ratio of cis and trans isomers obtained in the process is dependent upon reaction temperature, hydrogen pressure and catalyst concentration, until the reaction conditions are such that the 2,5-dimethylpiperazine product contains about 85% trans isomer any increase in the reaction time of the process will increase the percent trans isomer obtained in the 2,5-dimethylpiperazine product. As a corollary to this observation, the percent trans isomer obtained in the 2,5-dimethylpiperazine product under any given set of reaction conditions will tend to be reduced by shortening the reaction time. The effect of reaction time on the process can be summarized by noting that for any given set of reaction conditions, i.e. temperature, hydrogen pressure and catalyst concentration, there will be a minimum reaction time required to obtain a 2,5-dimethylpiperazine product containing 50% trans isomer. For example a reaction time as short as about 1 to 2 hours can be used in our process with the other conditions of the reaction being within their disclosed ranges. Although the minimum reaction time required to obtain 50% trans isomer in the 2,5-dimethylpiperazine product is dependent upon reaction temperature, hydrogen pressure and catalyst concentration, the precise time required can be either predicted or determined by a minimum of routine experimentation when the teachings of this application are followed.

*Example 2*

Three runs were made in which isopropanolamine was heated with 1.25 grams of Raney nickel catalyst per mol of isopropanolamine at 220° C. under 800 pounds hydrogen pressure. The runs were made for 4, 8 and 16 hours. The effect of time on conversion of isopropanolamine to 2,5-dimethylpiperazine and 2,5-dimethylpyrazine and the percent of the trans isomer obtained in the 2,5-dimethylpiperazine product is illustrated in Table I.

TABLE I

| Run No. | Time, Hours | Conversion | | | Percent trans isomer in DMP [a] |
|---|---|---|---|---|---|
| | | To: DMP [a] | To: DMPy [b] | Total | |
| 1 | 4 | 66 | 2 | 68 | 50 |
| 2 | 8 | 70 | 2 | 72 | 61 |
| 3 | 16 | 72 | 2 | 74 | 76 |

[a] 2,5-dimethylpiperazine.
[b] 2,5-dimethylpyrazine.

Two principal observations can be made from Table I. First, increasing the reaction time from 4 hours to 16 hours had little effect in increasing the total conversion of isopropanolamine to the desired products, thereby indicating that the reaction was essentially complete at the end of 4 hours. Secondly, while increasing the reaction time had only a slight effect upon the total conversion obtained, it had a very marked effect upon the percentage of the trans isomer obtained in the 2,5-dimethylpiperazine product which increased from 50% to 76% under the conditions studied. This effect of reaction time in increasing the percent of the trans isomer obtained in the 2,5-dimethylpiperazine product is very real and has been observed under widely varying conditions of temperature, hydrogen pressure and catalyst concentration.

EFFECT OF REACTION TEMPERATURE

Reaction temperature has a surprisingly important role in the process of the present invention in that it has a very pronounced effect on the percent transisomer obtained in the 2,5-dimethylpiperazine product. When all reaction variables except temperature are held constant, any increase in the reaction temperature will lead to an increase in the percent trans isomer obtained in the 2,5-dimethylpiperazine product. To obtain a 2,5-dimethylpiperazine product consisting predominantly of the trans isomer it is necessary to operate at a reaction temperature of at least 180° C. and preferably 200° C. or higher. In general, the process should be carried out at temperatures below 260° C. and preferably below 240° C. The effect of reaction temperature of the percent trans isomer obtained in the 2,5-dimethylpiperazine product is illustrated in Example 3.

*Example 3*

Four 4 hour runs were made in the presence of 1.25 grams of Raney nickel catalyst per mol of isopropanolamine under 800 pounds hydrogen pressure. The reaction temperatures employed were 180° C., 200° C., 220° C. and 240° C. The conversions obtained to 2,5-dimethylpiperazine and 2,5-dimethylpyrazine and the percent trans isomer obtained in the 2,5-dimethylpiperazine product as set forth in Table II.

TABLE II

| Run No. | Temperature, ° C. | Conversion | | | Percent trans isomer in DMP [a] |
|---|---|---|---|---|---|
| | | To: DMP [a] | To: DMPy [b] | Total | |
| 1 | 180 | 60 | 1 | 61 | 42 |
| 2 | 200 | 61 | 2 | 63 | 46 |
| 3 | 220 | 66 | 2 | 68 | 50 |
| 4 | 240 | 65 | 6 | 71 | 75 |

[a] 2,5-dimethylpiperazine.
[b] 2,5-dimethylpyrazine.

In studying Table II it will be noted that as the temperature is increased from 180° C. to 240° C. there is a very marked increase in the percent trans isomer obtained in the 2,5-dimethylpiperazine product. Similarly, the total conversion obtained also increased with reaction temperature thus showing the effect that increasing the reaction temperature has on increasing the rate of reaction.

EFFECT OF CATALYST CONCENTRATION

In all probability the reactions of interest take place on the surface of the nickel catalyst and the effect of increasing the concentration of the catalyst in a batch-type reaction (or the contact time in continuous process) is to increase the amount of material reacted per unit of time. Thus, the effect of increasing the catalyst concentration is similar to the effect noted in increasing the reaction time or the reaction temperature, i.e. increasing the catalyst concentration increases the percentage trans isomer obtained in the 2,5-dimethylpiperazine product. This effect is illustrated in the following examples.

*Example 4*

Three runs were made at 220° C. for 4 hours under 800 pounds hydrogen pressure. The catalyst concentrations employed were 0.63, 1.25 and 2.5 grams of Raney nickel per mol of isopropanol charged. The results are set forth in Table III.

TABLE III

| Run No. | Catalyst concentration [c] | Conversion | | | Percent trans isomer in DMP [a] |
|---|---|---|---|---|---|
| | | To: DMP [a] | To: DMPy [b] | Total | |
| 1 | 0.63 | 64 | 6 | 70 | 44 |
| 2 | 1.25 | 66 | 2 | 68 | 50 |
| 3 | 2.5 | 73 | 2 | 75 | 73 |

[a] 2,5-dimethylpiperazine.
[b] 2,5-dimethylpyrazine.
[c] In grams of wet catalyst/mol of isopropanolamine.

It will be noted in the above table that the percent trans isomer obtained in the 2,5-dimethylpiperazine product increased from 44% to 73% over the range of catalyst concentrations studied.

*Example 5*

Example 4 was repeated except that the hydrogen pressure of the system was increased to 1200 pounds and the run at 0.63 gram of Raney nickel catalyst per mol of isopropanolamine was eliminated and substituted with a run employing 1.88 grams of Raney nickel catalyst. The results are set forth in Table IV.

TABLE IV

| Run No. | Catalyst concentration [c] | Conversion | | | Percent trans isomer in DMP [a] |
|---|---|---|---|---|---|
| | | To: DMP [a] | To: DMPy [b] | Total | |
| 1 | 1.25 | 71 | 1 | 72 | 58 |
| 2 | 1.88 | 77 | 2 | 79 | 75 |
| 3 | 2.5 | 77 | 1 | 78 | 80 |

[a] 2,5-dimethylpiperazine.
[b] 2,5-dimethylpyrazine.
[c] In grams of wet catalyst/mol of isopropanolamine.

Again, it will be noted that increasing the catalyst concentration markedly increased the percent trans isomer obtained in the 2,5-dimethylpiperazine product. In general, the amount of catalyst used can vary widely. It can be seen that 0.63 gram catalyst per mole of isopropanol gave 44% trans 2,5-dimethylpiperazine in Run 1, Table III and, by increasing the severity of conditions of temperature and hydrogen pressure, over 50% of the trans isomer is obtained with this low catalyst concentration.

EFFECT OF HYDROGEN PRESSURE

Hydrogen pressure has three known effects upon the reaction. The first effect is that increasing the hydrogen pressure tends to lower the rate of reaction. The quantitative effect of hydrogen pressure on reaction rate is illustrated in Example 6.

*Example 6*

Three 4 hour runs were made at 180° C. in the presence of 1.25 grams of Raney nickel catalyst per mol of isopropanolamine. The hydrogen pressures employed were 200, 400 and 800 pounds per square inch. The results are set forth in Table V.

TABLE V

| Run No. | Temp., °C. | Hydrogen pressure | Conversion | | | Percent trans isomer in DMP (a) |
|---|---|---|---|---|---|---|
| | | | To: DMP (a) | To: DMPy (b) | Total | |
| 1 | 180 | 200 | 63 | 9 | 72 | 26 |
| 2 | 180 | 400 | 61 | 3 | 64 | 40 |
| 3 | 180 | 800 | 60 | 1 | 61 | 42 |

(a) 2,5-dimethylpiperazine.
(b) 2,5-dimethylpyrazine.

The total conversion to 2,5-dimethylpiperazine and 2,5-dimethylpyrazine dropped from 72% to 61% in increasing hydrogen pressure from 200 p.s.i. to 800 p.s.i.

A second effect of increasing the hydrogen pressure is to lower the percent 2,5-dimethylpyrazine obtained in the reaction. This effect is noted in Table V above where the percent 2,5-dimethylpyrazine obtained decreased from 9% to 1% as the hydrogen pressure was increased from 200 pounds to 800 pounds. A similar effect will be noted in Tables VI and VII subsequently set forth.

The third effect that is obtained in increasing the hydrogen pressure while maintaining the other variables constant is to increase the percent trans isomer obtained in the 2,5-dimethylpiperazine product. For example, in Example 6 above the percent trans isomer in the 2,5-dimethylpiperazine product obtained under 200 pounds hydrogen pressure was only 26% but this was increased to 42% as the hydrogen pressure was increased to 800 pounds under otherwise identical reaction conditions. No precise explanation is known for the increase in the proportion of the trans isomer so obtained. The quantitative effect of hydrogen pressure in this regard is shown in Examples 7 and 8.

*Example 7*

Three 4 hour runs were made at 200° C. in the presence of 1.25 grams of Raney nickel catalyst per mol of isopropanolamine. The hydrogen pressures employed were 200, 400 and 800 pounds per square inch. The results are set forth in Table VI.

TABLE VI

| Run No. | Temp., °C. | Hydrogen pressure | Conversion | | | Percent trans isomer in DMP (a) |
|---|---|---|---|---|---|---|
| | | | To: DMP (a) | To: DMPy (b) | Total | |
| 1 | 200 | 200 | (c)44 | (c)17 | (c)61 | 31 |
| 2 | 200 | 400 | 62 | 6 | 68 | 34 |
| 3 | 200 | 800 | 61 | 2 | 63 | 46 |

(a) 2,5-dimethylpiperazine.
(b) 2,5-dimethylpyrazine.
(c) Results too low, probably due to handling and or venting losses

*Example 8*

Three 4 hours runs were made at 220° C. in the presence of 1.25 grams of Raney nickel catalyst per mol of isopropanolamine. The hydrogen pressures employed were 400, 800 and 1200 pounds per square inch. The results are set forth in Table VII.

TABLE VII

| Run No. | Temp., °C. | Hydrogen pressure | Conversion | | | Percent trans isomer in DMP (a) |
|---|---|---|---|---|---|---|
| | | | To: DMP (a) | To: DMPy (b) | Total | |
| 1 | 220 | 400 | 67 | 9 | 76 | 41 |
| 2 | 220 | 800 | 66 | 2 | 68 | 50 |
| 3 | 220 | 1200 | 71 | 1 | 72 | 58 |

(a) 2,5-dimethylpiperazine.
(b) 2,5-dimethylpyrazine.

ISOMERIZATION OF CIS AND TRANS 2,5-DIMETHYLPIPERAZINE

In our study of the process giving predominately trans 2,5-dimethylpiperazine we have made the ancillary discovery that either cis or trans 2,5-dimethylpiperazine can be converted to the other by heating in the presence of nickel hydrogenation/dehydrogenation catalysts as illustrated in the reactions below:

(A)
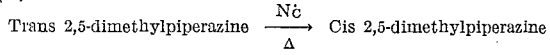
Trans 2,5-dimethylpiperazine $\xrightarrow[\Delta]{Ni}$ Cis 2,5-dimethylpiperazine (B)
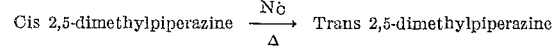
Cis 2,5-dimethylpiperazine $\xrightarrow[\Delta]{Ni}$ Trans 2,5-dimethylpiperazine Heating either pure cis or pure trans 2,5-dimethylpiperazine under identical conditions gives essentially the same mixture of cis and trans isomers. This observation suggests that the isomerization is an equilibrium reaction which can be represented mathematically as follows:

$$K \text{ isomerization} = \frac{(\text{Trans 2,5-dimethylpiperazine})}{(\text{Cis 2,5-dimethylpiperazine})}$$

At temperatures in the range of 180–220° C. the equilibrium mixture obtained contains approximately 80–85% trans 2,5-dimethylpiperazine so that K isomerization is indicated to have a value of from about 4.0 to about 5.5.

The isomerization of cis 2,5-dimethylpiperazine, trans 2,5-dimethylpiperazine and mixtures thereof is illustrated in the following examples.

*Example 9*

One hundred grams of cis 2,5-dimethylpiperazine and 10 grams of nickel catalyst (Harshaw 0104, Harshaw Chemical Company, Cleveland, Ohio) were charged into a rocking bomb autoclave. The bomb was heated to 225° C. and then pressurized to 1500 pounds per square inch with hydrogen. The bomb was heated for 3 hours and the product so obtained contained 80% trans 2,5-dimethylpiperazine and 20% cis 2,5-dimethylpiperazine.

*Example 10*

Example 9 was repeated except that trans 2,5-dimethylpiperazine was charged in lieu of the cis 2,5-dimethylpiperazine employed in Example 9. The product obtained contained 87% trans 2,5-dimethylpiperazine and 13% cis 2,5-dimethylpiperazine.

A systematic study of the variables in the isomerization indicates that the reaction reaches an equilibrium which can be approached from either direction, i.e. by isomerizing either cis 2,5-dimethylpiperazine or trans 2,5-dimethylpiperazine or mixtures thereof. Within the range of 200–220° C. the equilibrium mixture contains 80–85% trans 2,5-dimethylpiperazine. At lower isomerization temperatures, there are indications that the equilibrium mixture contains slightly more of the cis 2,5-dimethylpiperazine.

The importance of the discovery that cis and trans 2,5-dimethylpiperazine can be interconverted into each other can scarcely be over-emphasized, since it makes feasible recycle processes in which isopropanolamine is converted solely to cis 2,5-dimethylpiperazine or solely to trans 2,5-dimethylpiperazine.

RECYCLE TRANS 2,5-DIMETHYLPIPERAZINE PROCESSES

A preferred mode for synthesizing trans 2,5-dimethylpiperazine from isopropanolamine in a continuous process is illustrated diagrammatically in FIG. 1. Isopropanolamine is fed from line 101 into reactor 102 which is packed with a pelleted nickel catalyst. The reactor is maintained under conditions of high hydrogen pressure and high temperature such that essentially all of the isopropanolamine is converted to the desired products and by-products before being discharged through line 103 into stripping column 104.

Water and 2,5-dimethylpyrazine are removed from column 104 as overhead through line 105 condensed in condenser 106 and discharged into line 107. If the reaction mixture does not contain sufficient water to azeotropically remove all of the 2,5-dimethylpyrazine from the product, additional water is fed to the column by means not shown. Liquid in the pot of column 104, as well as columns 113, 121, 126 and 135 is heated by steam calandrias 108—108. The 2,5-dimethylpyrazine is fed from line 107 into dehydrating column 109 where it is dried by countercurrent washing with a strong caustic soda solution. The caustic solution enters the dehydrating column through line 110 and is discharged through line 111. The essentially dry 2,5-dimethylpyrazine is fed through line 112 into flash distillation column 113 and is removed as overhead through line 114, condensed in condenser 115 and recycled to reactor 102 through lines 116, 139 and 101.

The bottoms fraction from column 104 consisting of cis 2,5-dimethylpiperazine, trans 2,5-dimethylpiperazine and high boiling by-products is fed through 120 into flash distillation column 121 where the high boiling by-products are removed as bottoms fraction through line 122 and a mixture of cis 2,5-dimethylpiperazine and trans 2,5-dimethylpiperazine is removed as overhead through line 123, condensed in condenser 124 and fed through heated line 125 into a high efficiency distillation column 126. In column 126 the higher boiling cis 2,5-dimethylpiperazine is removed as a bottoms fraction and recycled to reactor 102 through lines 127, 139 and 101. The overhead removed through line 128 consists of trans 2,5-dimethylpiperazine of sufficient purity for many industrial purposes. Where the ultimate in purity is required, the overhead from line 128 is passed through condenser 129 and line 130 (both maintained appreciably above room temperature to prevent solidification of the trans 2,5-dimethylpiperazine) into a continuous crystallizer 131.

The mixture consisting predominately of trans 2,5-dimethylpiperazine and containing a small quantity of cis 2,5-dimethylpiperazine is cooled in crystallizer 131 so that the trans 2,5-dimethylpiperazine solidifies and the crystals thereof are removed downwardly and eventually discharged into product line 132 by a screw mechanism not shown. A saturated aliphatic hydrocarbon such as heptane is introduced into the bottom of crystallizer 131 through line 133 and travels upwardly countercurrently to the crystals of trans 2,5-dimethylpiperazine thereby washing same and dissolving any cis 2,5-dimethylpiperazine adhering thereto. The trans isomer is much less soluble in such a hydrocarbon solvent than is the cis isomer and other aliphatic hydrocarbons can also be used, such as hexane and decane, as well as cyclo-paraffins such as cyclohexane, aromatics, such as benzene, and ketones, such as acetone. All of the cis 2,5-dimethylpiperazine entering crystallizer 131 remains in the liquid state and is dissolved in the heptane. The heptane solution containing cis 2,5-dimethylpiperazine is fed through line 134 into stripping column 135 in which the heptane is removed as overhead through line 136, condensed in condenser 137 and recycled to crystallizer 131 through lines 138 and 133.

Cis 2,5-dimethylpiperazine together with possibly a small percentage of trans 2,5-dimethylpiperazine is obtained as a bottoms fraction from column 135 and is recycled to reactor 102 through lines 139 and 101. As earlier noted, 2,5-dimethylpyrazine is also recycled to reactor 102 through lines 116, 139 and 101. When recycled to the reaction zone, the 2,5-dimethylpyrazine is hydrogenated to form a mixture of cis and trans 2,5-dimethylpiperazine isomers and the recycled cis 2,5-dimethylpiperazine is isomerized to an equilibrium mixture of both the cis and trans isomers.

Trans 2,5-dimethylpiperazine can be obtained as the sole product from isopropanolamine in recycle processes that are carried out batchwise rather than continuously as illustrated above. This procedure is illustrated in Examples 11 and 12.

Example 11

Isopropanolamine was converted solely to trans 2,5-dimethylpiperazine in a series of runs that were carried out as follows:

Twenty mols (1500 grams) of isopropanolamine and about 525 grams of a predominantly cis 2,5-dimethylpiperazine fraction from an earlier batch run of the same size were charged with 50 grams of Raney nickel catalyst into a one gallon stainless steel autoclave. The reaction mixture was heated for 4 hours at 220° C. under 1200 pounds hydrogen pressure to obtain a product consisting predominantly of 2,5-dimethylpiperazine. The product was filtered free of nickel catalyst and the 2,5-dimethylpiperazine fraction was isolated by distillation.

The distilled 2,5-dimethylpiperazine fraction was dissolved in 1.2 times its weight of heptane at 85–95° C. and the solution was then cooled to room temperature to obtain a precipitate of trans 2,5-dimethylpiperazine. The trans 2,5-dimethylpiperazine product was filtered and washed twice with heptane fractions weighing 0.4 times the weight of original 2,5-dimethylpiperazine fraction obtained in the reaction. The heptane solutions were combined and distilled to obtain a predominantly cis 2,5-dimethylpiperazine fraction which was combined with 20 mols of isopropanolamine and used in the next reaction. The average conversion of isopropanolamine to isolated trans 2,5-dimethylpiperazine was 68–70%.

Example 11 illustrates a concurrent recycle process in which both isopropanolamine and a predominantly cis 2,5-dimethylpiperazine fraction are charged to the reactor. Two reactions take place simultaneously, i.e. the isopropanolamine is converted directly to 2,5-dimethylpiperazine and the cis 2,5-dimethylpiperazine is isomerized to enriched trans 2,5-dimethylpiperazine. In contrast with this procedure, it is also possible to operate a recycle process on a periodic recycle basis. In this type of operation, the heptane soluble predominantly cis 2,5-dimethylpiperazine fraction obtained in the work up of the product is not recycled with fresh isopropanolamine, but is accumulated and directly isomerized to trans 2,5-dimethylpiperazine by heating with a nickel hydrogenation/dehydrogenation catalyst. This method of operation is illustrated by Example 12.

Example 12

PART A

Two runs were made in each of which 2500 grams (33.3 mols) of isopropanolamine and 38 grams of Raney nickel catalyst were charged to a one gallon stainless steel autoclave and heated for 4 hours at 220° C. under 1200 pounds hydrogen pressure. Thereafter the reaction products were isolated and worked up as described in Example 11.

PART B

The predominantly cis 2,5-dimethylpiperazine fractions from Part A together with the cis 2,5-dimethylpiperazine fraction obtained from another isomerization run of the same size were charged to the autoclave with 50 grams of Raney nickel catalyst and heated for 4 hours at 210° C. under 1200 pounds hydrogen pressure. The reaction products were worked up as previously described.

The overall conversion of isopropanolamine to trans 2,5-dimethylpiperazine was approximately 70%.

RECYCLE CIS 2,5-DIMETHYLPIPERAZINE PROCESSES

An exceedingly important feature of our discovery that trans 2,5-dimethylpiperazine can be isomerized to cis 2,5-dimethylpiperazine is that it affords for the first time a practical method of converting isopropanolamine solely to cis 2,5-dimethylpiperazine.

A preferred mode for synthesizing cis 2,5-dimethylpiperazine from isopropanolamine in a continuous process is illustrated diagrammatically in FIG. 2. Isopropanolamine is fed from line 1 into reactor 2 which is packed with a pelleted nickel catalyst. The reactor is maintained under hydrogen pressure and mild temperature conditions i.e. less than 180° C. The reaction products are passed from reactor 2 through a line 3 to a stripping column 4.

Water and 2,5-dimethylpyrazine are removed from column 4 as overhead through line 5, condensed in condenser 6 and discharged into line 7. If the reaction mixture does not contain sufficient water to azeotropically remove all of the 2,5-dimethylpyrazine from the product, additional water is fed to the column by means not shown. Liquid in the pot of column 4, as well as columns 13, 17, 28, 36, 47, 59, 66, 75 and 85 are heated by steam calandrias 8—8. The 2,5-dimethylpyrazine is fed from line 7 into dehydrating column 9 where it is dried by countercurrent washing with a strong caustic soda solution which enters column 9 from line 10 and is discharged through line 11. The essentially dry 2,5-dimethylpyrazine is fed through line 12 into flash distillation column 13 and is removed as overhead through line 14.

The 2,5-dimethylpyrazine overhead from line 14 is fed together with high pressure hydrogen from a source not shown through hydrogenator 15 where it is reduced to 2,5-dimethylpiperazine. The reaction mixture from hydrogenator 15 is fed through line 16 into stripping column 17. A small quantity of water is introduced into stripping column 17 through line 18 so as to form an azeotrope with any unreacted 2,5-dimethylpyrazine which is removed as overhead through line 19, condensed in condenser 20 and recycled to dehydrating column 9 through lines 21 and 7. The bottoms fraction from column 17 is fed through line 22 to an alumina packed drying column 23 and is then fed through line 24 into line 58. The further treatment of the crude hydrogenation mixture is subsequently described.

The bottom fraction from column 4, which consists predominantly of isopropanolamine, cis 2,5-dimethylpiperazine, trans 2,5-dimethylpiperazine and high boiling by-products is fed through line 27 into fractionating column 28. Xylene from line 29 is fed into column 28 and forms an azeotrope with isopropanolamine which is removed as overhead through line 30. Upon being condensed and cooled in condenser 31, the isopropanolamine-xylene azeotrope is fed through line 32 into decanter 33 where it separates into two distinct phases, an upper phase consisting of approximately 96% xylene and 4% isopropanolamine and a lower phase consisting of approximately 80% isopropanolamine and 20% xylene. The upper phase which contains only 4% isopropanolamine is returned to column 28 through lines 34 and 29. The isopropanolamine rich lower phase from decanter 33 is fed through line 35 into fractionating column 36. All of the xylene is removed as an overhead isopropanolamine-azeotrope through line 37 and is fed into decanter 41 through condenser 38 and line 39. The upper phase from decanter 41 is returned to column 28 through lines 42, 34 and 29 and the lower phase from the decanter 41 is recycled to column 36 through lines 43 and 35. Xylene-free isopropanolamine is obtained as a bottoms fraction column 36 and is returned to reactor 2 through lines 44 and 1.

The bottoms fractions from column 28 consisting of cis 2,5-dimethylpiperazine, trans 2,5-dimethylpiperazine and high boiling by-products is fed through line 46 into flash distillation column 47 where the high boiling by-products are removed as a bottoms fraction through line 48 and a mixture of cis 2,5-dimethylpiperazine and trans 2,5-dimethylpiperazine is removed as overhead through line 49 and fed into continuous crystallizer 52 through line 51. Condenser 50 and line 51 are both maintained appreciably above room temperature to prevent solidification of trans 2,5-dimethylpiperazine.

The mixture of cis 2,5-dimethylpiperazine and trans 2,5-dimethylpiperazine is cooled in crystallizer 52 so that the trans 2,5-dimethylpiperazine solidifies and the crystals thereof are moved downwardly and eventually discharged into line 53 by a screw mechanism not shown. Line 53 is heated so as to melt the trans 2,5-dimethylpiperazine which is transferred to isomerization column 56. A saturated aliphatic hydrocarbon such as heptane is introduced into the bottom of crystallizer 52 through line 54 and travels upwardly countercurrently to the crystals of trans 2,5-dimethylpiperazine thereby washing same and dissolving any cis 2,5-dimethylpiperazine adhering thereto. All of the cis 2,5-dimethylpiperazine entering crystallizer 52 remains in the liquid state and is dissolved in the saturated aliphatic hydrocarbon solvent. The heptane solution containing cis 2,5-dimethylpiperazine is fed through line 55 into stripping column 75.

Trans 2,5-dimethylpiperazine from line 53 is fed through isomerization column 56 which is packed with a pelleted nickel catalyst and heated so as to isomerize at least a portion of the trans 2,5-dimethylpiperazine to cis 2,5-dimethylpiperazine. The resulting mixture of cis 2,5-dimethylpiperazine and thans 2,5-dimethylpiperazine is fed through line 58 together with the mixture of cis 2,5-dimethylpiperazine and trans 2,5-dimethylpiperazine obtained by the hydrogenation of 2,5-dimethylpyrazine (from line 24) into stripping column 59 where any low boiling by-products obtained either in the hydrogenation of the 2,5-dimethylpyrazine or the isomerization of the trans 2,5-dimethylpiperazine are removed as overhead through line 60, condenser 61 and line 62. The bottoms fraction from column 59 is fed through line 65 into stripping column 66 where any high boiling by-products are removed as a bottoms fraction through line 67. A mixture of cis 2,5-dimethylpiperazine and trans 2,5-dimethylpiperazine is obtained as overhead through line 69 and is fed through condenser 69 and lines 70 and 51 into continuous crystallizer 52.

The heptane solution of enriched cis 2,5-dimethylpiperazine is fed from line 55 into stripping column 75 which is operated so as to distill most of the heptane as overhead through line 76 and this distillate is recycled to continuous crystallizer 52 through condenser 77 and lines 78 and 54. A bottoms fraction consisting of approximately 90% of enriched cis 2,5-dimethylpiperazine and 10% heptane is obtained from stripping column 75 and is fed through line 79 into crystallizer 80. Crystallizer 80 is maintained at a temperature of about 10° C. or lower so as to freeze the final traces of trans 2,5-dimethylpiperazine from the product and the crystals thereof are moved downwardly and discharged into line 81 by a screw mechanism not shown. Line 81 is heated to liquefy the crude trans 2,5-dimethylpiperazine which contains an appreciable quantity of cis 2,5-dimethylpiperazine and this mixture is recycled to crystallizer 52 through lines 81, 70 and 51.

Pure cis 2,5-dimethylpiperazine containing a small quantity of heptane is removed through line 84 and fed into flash distillation column 85 where the heptane is removed as overhead through line 86, condensed in condenser 87 and recycled to crystallizer 52 through lines 88, 78 and 54. Pure cis 2,5-dimethylpiperazine is obtained as a bottoms fraction from column 85 and is discharged through product line 89.

The principal ditfficulty in developing a continuous or recycle process for the production of cis 2,5-dimethylpiperazine is that the isomerization of trans 2,5-dimethylpiperazine to cis 2,5-dimethylpiperazine over nickel and the hydrogenation of 2,5-dimethylpyrazine over nickel are both relatively inefficient and produce only a small quantity of the cis isomer. It is known that 2,5-dimethylpyrazine can be reduced to 2,5-dimethylpiperazine by chemical methods. The literature references do not indicate that the ratio of cis and trans isomers obtained in such chemical reductions, but there is reason to believe that at least some of these chemical methods are nonselective and will give at more favorable cis/trans ratio than is obtained by catalytic hydrogenation over nickel. In this event a more efficient recycle process could comprise the steps of dehydrogenating the trans 2,5-dimethylpiperazine to 2,5-dimethylpyrazine and then reducing the 2,5-dimethylpyrazine chemically. The resulting mixture of cis and trans 2,5-dimethylpiperazine would then be separated.

Of course it is not essential to carry out recycle cis 2,5-dimethylpiperazine processes continuously, as they can also be carried out batch-wise essentially as described in Examples 11 and 12.

What is claimed is:

In a method for tthe production of cis 2,5-dimethylpiperazine, the step of isomerizing trans 2,5-dimethylpiperazine by heating trans 2,5-dimethylpiperazine and a nickel-containing hydrogenation/dehydrogenation catalyst in contact with an atmosphere of hydrogen.

References Cited in the file of this patent

Godchot et al.: Bull. Soc. Chem. 51, 349–360 (1932).
Bain et al.: J. Am. Chem. Soc., 61, 532 (1939).
Kitchen et al.: J. Am. Chem. Soc., 69, 854–855 (1948).
Martin et al.: J. Am. Chem. Soc., 70, 1817–1818 (1948).